(12) United States Patent
Chang

(10) Patent No.: US 9,069,825 B1
(45) Date of Patent: Jun. 30, 2015

(54) SEARCH DIALOGUE USER INTERFACE

(71) Applicant: Google Inc., Mountain View, CA (US)

(72) Inventor: Lawrence Chang, Foster City, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/832,603

(22) Filed: Mar. 15, 2013

(51) Int. Cl.
*G06F 17/30* (2006.01)

(52) U.S. Cl.
CPC ................ *G06F 17/30554* (2013.01)

(58) Field of Classification Search
USPC ............... 707/722, 723, 706, 707; 709/206
See application file for complete search history.

(56) References Cited

U.S. PATENT DOCUMENTS

| | | | |
|---|---|---|---|
| 7,617,226 B1 * | 11/2009 | Burrows et al. ...................... 1/1 |
| 7,720,856 B2 * | 5/2010 | Goedecke et al. ............ 707/759 |
| 2007/0276811 A1 | 11/2007 | Rosen |
| 2008/0249992 A1 * | 10/2008 | Goedecke et al. ................ 707/3 |
| 2012/0197871 A1 * | 8/2012 | Mandel et al. ............... 707/722 |
| 2013/0024474 A1 | 1/2013 | Kraft et al. |

OTHER PUBLICATIONS

Keith Clark and al., Multi-Threadding and Message Communication in Qu-Prolog, May 2001, ACM, 283-301.*

* cited by examiner

*Primary Examiner* — Jean B Fleurantin
(74) *Attorney, Agent, or Firm* — Fish & Richardson P.C.

(57) ABSTRACT

Methods, systems, and apparatus, including computer programs encoded on a computer storage medium, for a search dialog user interface. In one aspect, a method includes displaying a search using interface, comprising: a search dialog user interface in which a plurality of search threads are initiated, each search thread comprising a plurality of entries, wherein the entries comprise: one or more query messages, each query message being descriptive of one or more search criteria, one or more result messages, each result message being a message describing criteria for a corresponding search and that is responsive to one or more preceding query messages within the search thread; and a search result display location in which search results corresponding to an active result message are displayed.

20 Claims, 5 Drawing Sheets

SEARCH DIALOGUE USER INTERFACE

BACKGROUND

This specification relates to search query processing and a search user interface.

The Internet provides access to a wide variety of resources, for example, video files, image files, audio files, or Web pages, including content for particular subjects, book articles, or news articles. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources to provide search results. The search results are typically ordered according to the scores and presented according to this order.

However, it may be challenging for users to utilize their search history in new search sessions. Users often revise their submitted queries based on the results received. Such process can be time consuming and may span multiple search sessions. Not being able to effectively access and manage a user's search history can significantly degrade the user's experience during such process. While some systems may provide some search history data to the user, the lack of organization in the search history presentation may prevent the user from effectively continuing a previous session or tracing back steps taken in previous sessions.

SUMMARY

In general, one innovative aspect of the subject matter described in this specification can be embodied in methods that include the actions of displaying a search using interface, comprising: a search dialogue user interface in which a plurality of search threads are initiated, each search thread comprising a plurality of entries, wherein the entries comprise: one or more query messages, each query message being descriptive of one or more search criteria, and one or more result messages, each result message being a message describing criteria for a corresponding search and that is responsive to one or more preceding query messages within the search thread; and a search result display location in which search results corresponding to an active result message are displayed. Other embodiments of this aspect include corresponding systems, apparatus, and computer programs, configured to perform the actions of the methods, encoded on computer storage devices.

These and other embodiments can each optionally include one or more of the following features. Each of the one or more result messages can be a message describing derived criteria for a corresponding search that is collectively responsive to preceding query messages within the thread.

The active result message can be a last ordered result message within the search thread.

The active result message can be manually activated by a user input specifying a selection of the result message.

The search thread can include entries by two or more users, wherein a first of the two or more users provides entries at the user device and a second of the two or more users provides entries from another user device.

Each search thread from the search threads can be associated with a priority value and ordered in a ranking based on the priority value. The priority value can be determined based on frequency of interaction with threads.

A default search query can be provided to the search dialogue interface based on frequency of interaction with queries.

The threads can be aggregated based on topics and displayed according to the topics.

The threads can include sub-threads, each sub-thread being a thread branching from a one of a query message or result message so that a result message in a first sub-thread is responsive to criteria that is different from criteria to which a result message is responsive to in a second sub-thread.

The threads can be grouped according to thread labels and displayed according to the thread labels.

Particular embodiments of the subject matter described in this specification can be implemented so as to realize one or more of the following advantages. The user interface facilitates a hierarchal, temporal and contextual view of a search session, which enables users to readily discern a previous search strategy and continue along the same strategy or revise the same. This, in turn, results in browser search histories that are easier and faster to navigate than search histories that are presented only as an unassociated list of temporal queries that were submitted to a search engine. Furthermore, the threaded contexts of the search histories allow for ready organization of a search history by the user. Additionally, prioritization and filtering of search threads may be customized according to interest signals, such as recency of interaction, session duration, and the like.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies relating to search dialogue user interface that facilitates communications with a search engine and archiving of such communications. A search dialogue user interface allows users to effectively manage their respective search histories. Each respective search history is maintained in the form of a dialogue between users and a search engine. Query messages entered by a user are displayed within the search dialogue interface, and submitted to a search engine. A message containing a link to results returned by the search engine is displayed in the search dialogue user interface as a message from the search engine.

In some implementations, the search dialogue user interface includes a plurality of threads. Each thread contains query messages and query result messages that pertain identical or similar topics, e.g., topics for which a user is seeking information. A query message is an input to the thread submitted by the user. The search system uses one or more query messages to construct a query and searches resources based on the query. The search engine responds with result message that describes the search query and that is responsive to one or more preceding query messages within the search thread. Furthermore, search results for the result message are displayed in a location in the dialogue that is separate from the location in which the thread is displayed.

Therefore, a user can manage and access previous searches based on their search threads and more efficiently utilize their respective user history. For example, the search dialogue user interface enables users to access an old search thread to continue a previous search session. Since query messages previously submitted and result messages previously received are displayed within the thread, the user can, for example, continue to refine the last query submitted in the previous session. The search dialogue user interface also enables users to easily access previous search results based on the search topic.

These features and other features will be described in more detail in the sections that follow.

Figure 1:
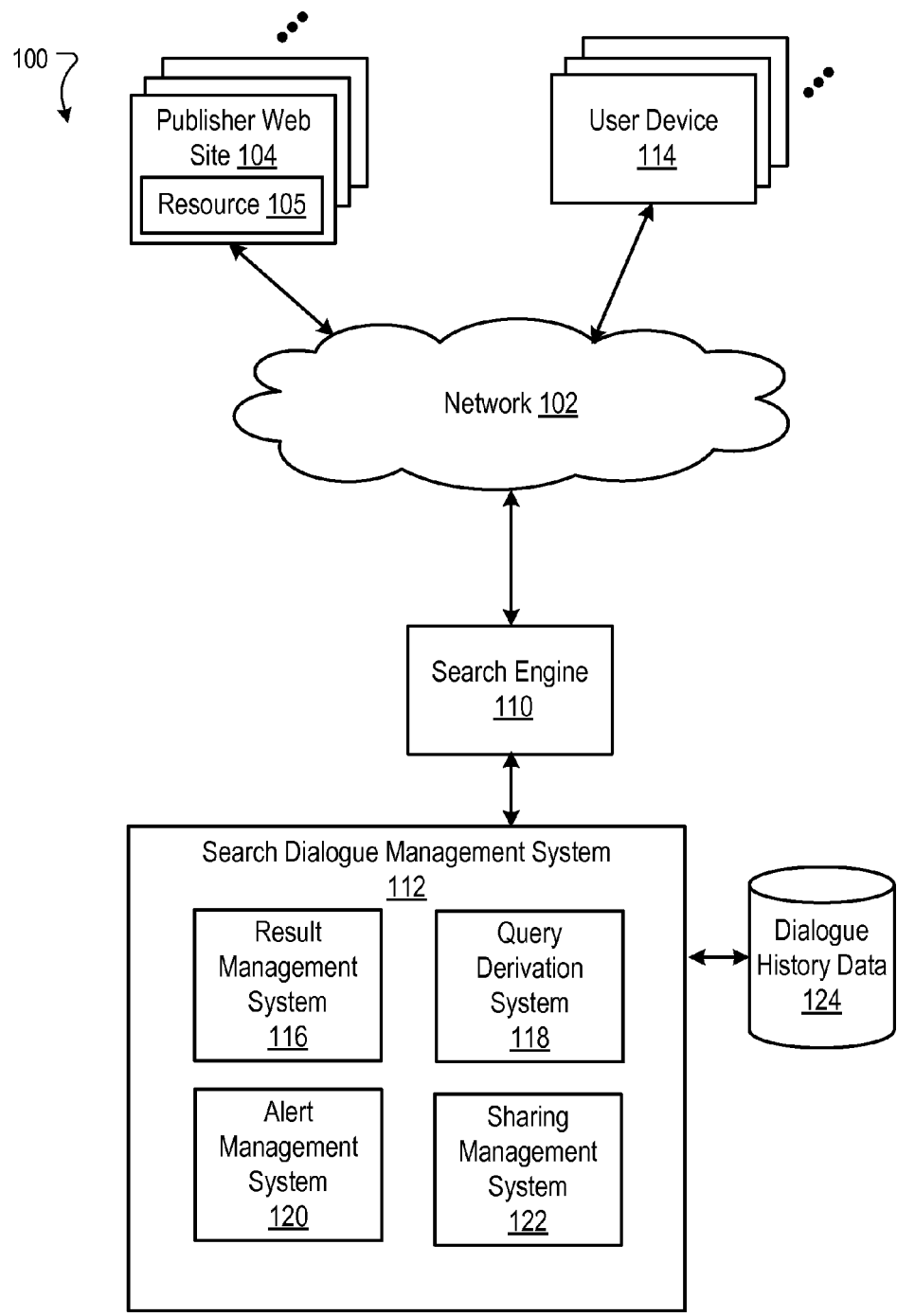
FIG. 1 is block diagram of an environment in which a search engine provides search services through a search dialogue management system.

FIG. 1 is a block diagram of an example environment 100 in which a search engine 110 provides search services. A computer network 102, such as a local area network (LAN), wide area network (WAN), the Internet, or a combination thereof, connects publisher web sites 104, user devices 114, and a search engine 110. The search engine 110 includes a search dialogue management system 112, the operations of which will be described below.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource 105 is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A user device 114 is an electronic device that is under the control of a user and is capable of requesting and receiving resources over the network 102. Example user devices 114 include personal computers, mobile communication devices, and other devices that can send and receive data over the network 102. A user device 114 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. In some implementations, the search dialogue management system 112 facilitates the organization of user search history and sessions from user devices 114 for the search engine 110 into search threads. The example search dialogue management system 112 includes components such as a result management system 116, a query derivation system 118, an alert managements system 120, and a sharing management system 122. However, other functional components can also be used to implement the search dialog management system.

Figure 2:
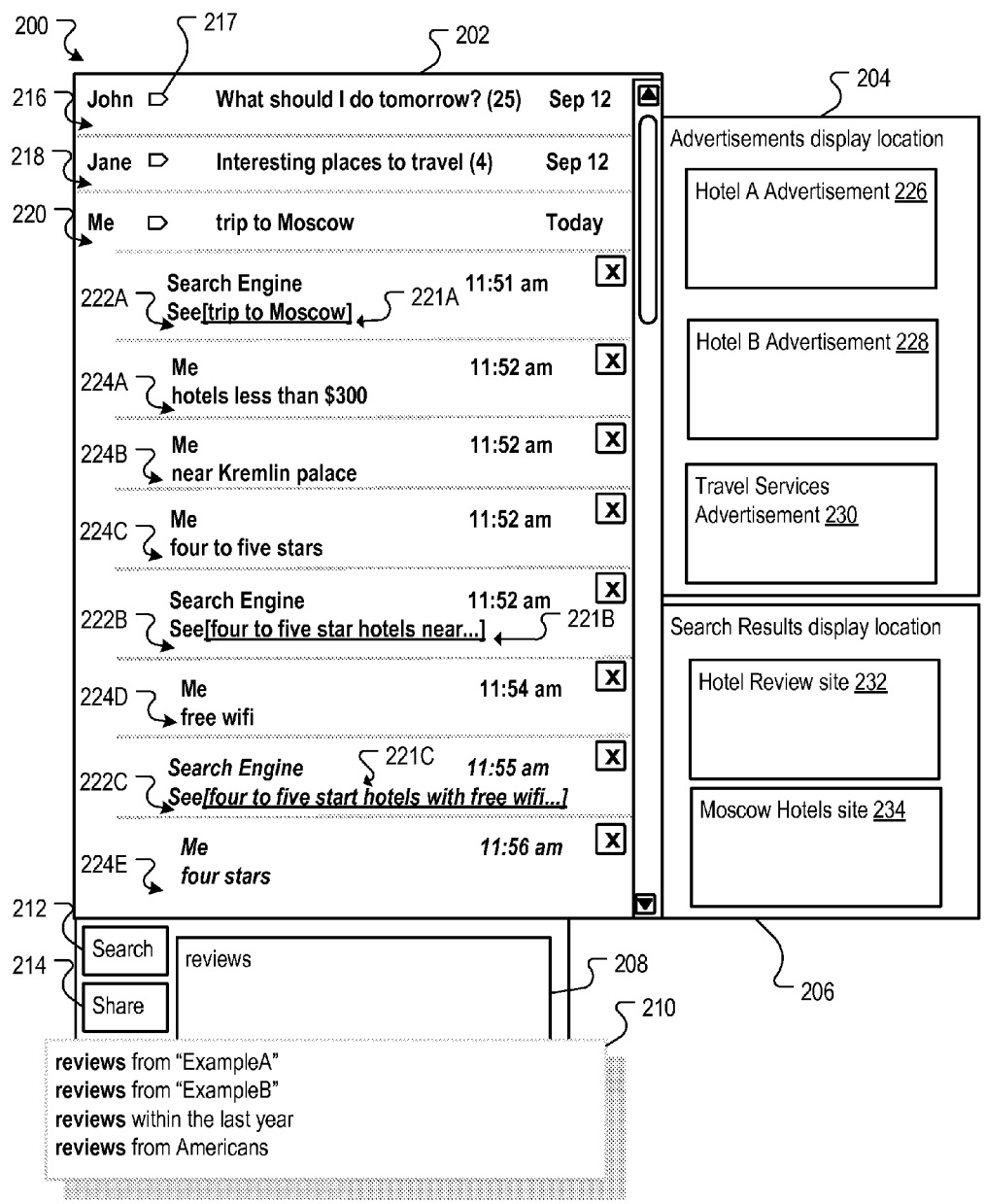
FIG. 2 is an illustration of an example search dialogue user interface.

The search engine 110 provides instructions to the user devices 114 that cause the user device to generate a search dialog user interface. An example of such an interface 200 is shown in FIG. 2. The search dialogue user interface includes a main window 202 in which threads 216, 218, and 220 are displayed. A thread 220 can be expanded to display messages 222 and 224 within main window 202. The threaded messages include both query messages 224A-224E and result messages 222A-222C. The thread 220 contains messages related to the topic "trip to Moscow." The messages 222 and 224 are displayed in the form of a dialogue between a user and a search engine.

The user devices 114 submit search query messages to the search dialogue management system 112. A query message is a message that is descriptive of one or more search criteria. One query message may be used to form a query, or several query messages may be used to form a query. The query derivation system 118 processes the query messages according to a conversation paradigm and derives queries from one or more submitted search query messages. For example, the query derivation system 118 may combine two query messages submitted by the user in quick succession to generate a single query. In some implementations, the query derivation system 118 processes the query messages after an indication that a user has completed a query input. The indication may be, for example, a pause in typing that exceeds a threshold time, or a failure to begin a new query message after the expiration of a period of time after sending a previous query message.

In some implementations, query messages pertaining similar or identical topics are presented in a single thread. For example, a query search message for "Hotels in Moscow" may be placed within the same thread as a query search for "lodging in Moscow." In some implementations, the advertisement management system 112 may automatically place queries in threads based on each query's topic. In some implementations, users may manually place queries in a selected thread.

In response to a query message, the search engine 110 identifies resources that are relevant to the search criteria specified by the query message. A search result is data generated by the search engine 110 that identifies a resource that satisfies a particular search query, and includes a resource locator for the resource. An example search result can include a web page title, a snippet of text extracted from the web page, and the URL of the web page. The search results are ranked based on scores related to the resources identified by the search results, such as information retrieval ("IR") scores, and optionally a separate ranking of each resource relative to other resources (e.g., an authority score).

The result management system 116 receives search results from search engine 110. In turn, the result management system 116 generates a result message based on the received search results. Each result message is a message that describes criteria for a corresponding search and that is responsive to one or more preceding query messages within the search thread. The search result message is placed within the same thread of the queries to which the result message is responsive. For example, a result message 222A in FIG. 2 corresponds to the search message 220. The result message may also include a link 221A, the selection of which changes the "focus" of the thread search results in the location 206 to the search results that correspond to the result message 222A.

Threads and messages for each session are stored within a dialogue history data store 124. In some implementations, each user is associated with a user account that is linked to a unique user identifier. Other data associated with a user, such as interface preferences, may also be stored in dialogue history data store 124. Generally, dialogue history data 124 for a particular user is not accessible by other users, unless otherwise specified by the particular user. The dialogue history data 124 may also include click data for the query message, and the web pages referenced by the search result messages may also be stored in search dialogue history data. The click data define actions taken responsive to search results provided by the search result messages.

The sharing management system 122 facilitates sharing threads and messages from search dialogue user interface belonging to a first user with a search dialogue user interface belonging to one or more different users. For example, a user operating a first user device 114 may submit a query message to a search dialogue user interface and select to share the query and results with a second user operating another device 114. The sharing management system 122 generates data that causes the query message and the result message to appear on the search dialogue user interfaces on both user devices 114. In some implementations, the shared results may be presented in a new thread within the search dialogue user interface displayed on user device 114. In some implementations, a user may select to share messages with a plurality of users simultaneously. The sharing management system 122 is responsible for sending each selected message to user accounts and devices associated with each selected user.

For example, as shown in FIG. 2, threads 216 and 218 have been shared by users John and Jane, respectively. The user can select either thread to expand the thread and review the query messages and the result messages that are included in the thread. As indicated in FIG. 2, the thread 216 has 25 query and result messages, while the thread 218 has four query and result messages.

The alert managements system 120 facilitates monitoring the search dialogue user interface and providing an alert to users when certain conditions are met. For example, a user may utilize the alert managements system 120 to monitor a particular search thread, and to provide the user with an alert if new search results are available for the queries within that thread. Therefore, a user does not need to frequently submit the same or similar queries to check if new results are available, instead the user is alerted by the search dialogue interface when new results are available. Multiple alerts may be set-up simultaneously for a user, and criteria for each alert can be customized separately.

In some implementations, an advertisement system (not shown) may facilitate the provisioning of advertisements for display in the search dialogue user interface. Advertisers may define selection rules that take into account search results shown in the user interface to select advertisements for display in the user interface. Example selection rules include keyword targeting, in which advertisers provide bids for keywords that are present in either search queries, search query messages or webpage content. Advertisements that are associated with keywords having bids that result in an advertisement slot being awarded in response to an auction are selected for displaying in the advertisement slots.

Result messages such as 222A may contain a designator indicating that the message is a result message from the search engine. Likewise, query messages such as 224A may contain a designator indicating that the message is a query message and identifying the user that entered the query message. Each message within thread 220 contains a time stamp specifying the time each respective message is sent to or received from the search dialogue management system 112. Search result messages such as 222A also include a link 221A that specifies the search criteria and cause search results responsive to the criteria to be shown in the search results display area 206.

As shown in FIG. 2, the user began the thread 220 with the query "trip to Moscow." Because this is the first query message, it is used as the title of the thread 220. In response to this query message, the result message 222A was received. Thereafter, the user entered three query messages—224A, 224B and 224C, after which the result message 222B was received. The user input one more query message 224D, to which the result message 222C was received. At present, the user has input the query message 224E and is in the process of inputting another message in the input 208. The messages 222C and 224E are displayed in italics to identify the currently selected result message and the last entered query message.

As described above, queries are derived by the query derivation system 118 from one or more query messages. For example, query messages 224A-224C each specifies a different criterion for hotels in relation to the topic "trip to Moscow." Query message 224A indicates that the user is searching for "hotels less than $300" near Moscow. Query message 224B indicates that the user is interested in a location "near the Kremlin palace." Lastly, query message 224C indicates that the user is searching for a "four to five star" rating. The query derivation system 118 derives from query messages 224A-224C that the user is searching for "four to five star hotels near the Kremlin palace." The derived query is processed by the search engine 110 the result message 222B is provided in response.

In some implementations, the query derivation system 118 derives a query from all query messages previously submitted within a thread. For example, message 224D within thread 220 indicates that the user is searching for "free WIFI." The query derivation system 118 may derive a new query based on query messages 224A-224C in combination with 224D. Result message 222C may contain a link 221C to a search result page responsive to a search for "four to five star hotels with free WIFI near the Kremlin palace."

A variety of appropriate derivation techniques can be used to generate a query from multiple query messages. For example, one implementation concatenates multiple query messages and uses natural language processing to formulate the query. Other appropriate query formulation algorithms can also be used.

In the user interface 200, the search result display location 206 is displayed in the bottom right corner. In other implementations, the search result display location 206 may be omitted from the search dialogue user interface, and results may be provided in a separate window. The search result display location 206 provides a location to display results corresponding to an active search result message. In some implementations search result messages are activated manually by users by, for example, a click on the link 221. In other implementations, the search result message responsive to the last entered query message 224E is automatically activated and search results responsive to that query message are displayed in the search result display location 206.

Threads are displayed separately and are individually selectable. For example, thread 218 contains messages related to the topic "interesting places to travel," while thread 220 contains messages related to the topic "trip to Moscow." In some implementations, some threads may be parent-threads that contain sub-thread nodes that are related to a more specific topic than those of the parent-thread. For example, the thread 220 titled "trip to Moscow" may contain two sub-threads, such as "travel arrangements" and "places to visit." The "travel arrangements" sub-thread may contain messages related to flights and hotels for a "trip to Moscow." The "places to visit" sub-thread may contain messages related to landmarks and interesting locations to visit during a Moscow trip.

In some implementations, threads and sub-threads may be generated and aggregated manually by users. For example, a thread hierarchy of FIG. 2 for the thread 220 may be of the form:

QM00: trip to Moscow
RM01: trip to Moscow
QM02: hotels less than $300
QM03: near Kremlin palace
QM04: four to five stars
RM05: four to five star hotels near . . .
QM06: free wifi
RM07: four to five start hotels with free wifi . . .
QM08: four stars In the hierarchy above, the query message QM00 is a root node, and each query message and result message is a respective child node descending from the root node and each preceding node for a query message or a result message. Assume the user wants to now revise the query message "hotels less than $300" to "hotels less than $600." The user, in some implementations, has two options. The first option is to input a new query message "hotels less than $600" subsequent to the query message "www.Examplehotel.com." The resulting query will revise the price constraint from "less than $300" to "less than $600," and leave all other criteria resulting from query messages QM03, QM04, QM06 and QM08 the same, e.g., Q=f(QM00, QM02, QM03, QM04, QM06, QM08, QM09)

Where QM09 is the query message "hotels less than $600." The resulting hierarch is:

QM00: trip to Moscow
RM01: trip to Moscow
QM02: hotels less than $300
QM03: near Kremlin palace
QM04: four to five stars
RM05: four to five star hotels near . . .
QM06: free wifi
RM07: four to five star hotels with free wifi . . .
QM08: four stars
QM09: hotels less than $600

Another option is to select the result message RM01 and then input the query message "hotels less than $600." Doing so creates a new node in the thread hierarchy that is a child of the node for the result message RM01:

QM00: trip to Moscow
RM01: trip to Moscow
QM02: hotels less than $300
QM03: near Kremlin palace
QM04: four to five stars
RM05: four to five star hotels near . . .
QM06: free wifi
RM07: four to five start hotels with free wifi . . .
QM08: four stars
QM12: hotels less than $600

Accordingly, the query that would result would be "Hotels in Moscow less than $600." Corresponding sub-threads are also rendered in the user interface 200, the first sub-thread with the query message "hotels less than $300" corresponding to the first node and with remaining nodes QM03-QM08, and the second sub-thread with the query message "hotels less than $600" corresponding to the only node in the sub-thread.

Other ways of revising a thread may also be implemented. For example, in some implementations, query and result messages may include a delete button. The delete button may be used to remove query messages and result messages from a thread. Deleting a query message from a thread may revise result messages subsequent to the deleted message. For example, assume in FIG. 2 the user deletes the query message 224. In response, the search criteria for a result message are revised to exclude the "free wifi" criterion. In some implementations, the result message 222C is updated to exclude the deleted criterion and the corresponding search results displayed in the location are likewise updated. In other implementations, the result message 222C and all subsequent messages are deleted and a new result message that excludes the criterion "free wifi" is displayed. Finally, in yet another implementation, a new node for a new sub-tread is created as described above.

Instead of manually deleting a result message, the user may provide a query input that accomplishes the same or similar revision in the to the search criteria. For example, the user may type "Forget free wifi" in order to exclude query message. This type of revision can be implemented, for example, using natural language processing techniques, or by coding a revision command, such as "forget:" where the terms following the colon are excluded from the criteria (or negative terms).

In some embodiments, a thread may contain messages submitted by two or more users. For example, a thread may contain query messages submitted by a first user using a first device, and query messages submitted by a second user using a second device. In such cases search results are returned and displayed at the first and second user devices. Accordingly, two or more users can simultaneously contribute to constructing a query by submitting independent query messages to the search dialogue interface, and in response the query derivation system 118 derives a query from query messages submitted by both users. For example, the user may select the thread 218, add several query messages, and then transmit the modified thread back to the user "Jane" for review by the user.

In some implementations, threads may be ranked based on a priority value for each thread. A priority value for each thread may be determined, for example, based on frequency of interaction with the thread. For example, a user actively submitting query messages within a thread raises the priority value of that thread. In some embodiments, user interaction with result messages within a thread raises the priority value of that thread. Threads may be ordered in a ranking based on their priority value, and displayed according to the order. In the user interface 200 of FIG. 2, thread 216 titled "what should I do tomorrow?" has a higher priority than thread 218 titled "interesting places to travel." Ordering threads based on priority values facilitates ease of access of threads frequently interacted with. Additionally, topics of highly ranked threads may provide a strong indication of users interests. Such information may be used to further customize the search dialogue user interface for different users. For example, a default search may be suggested to the user based on the topic of the highest ranking thread.

In some implementations, threads may be labeled. For example, a label indicator 217 may correspond to one of a set of pre-defined and/or user defined labels. Such labels are used to group threads according to categories that may be assigned by the user. For example, threads 218 and 220 may be associated with "travel" label defined by the user. Conversely, thread 216 may be associated with a "friend" label" assigned by the user.

The search dialogue user interface includes a message input field 208. The message input location 208 facilitates submission of messages to the search dialogue user interface. In some implementations, the message input field 208 is in the form of a "chat" type input, and the user enters the query message by pressing a return key.

The search dialogue user interface may also include a "search" button 212 and a "share" button 214. The search button 212 is used to create a new thread. For example, should the user decide to begin searching for shoes unrelated to the Moscow subject matter, the user may create a new search thread by typing in the search input "running shoes for under $150" and then pressing the search button 212. This causes the query message to be sent to the search engine 110 with an instruction that causes the search engine to create a new search thread. Accordingly, the query messages from other threads, such as thread 220, are then not used to generate search criteria for the newly created search thread for "running shoes for under $150."

The share button 214 is used to share an active search thread with one or more other users. In some implementations, a user may share query messages and result messages of a thread with multiple different users simultaneously, e.g., by typing in or selecting users in a resulting dialog box that appears in response to selecting the share button 214.

The suggestion display location 210 displays suggestions based on input provided in message input location 208. Suggestions may be provided by the search dialogue management system 212 directly or by requesting suggestions from search engine 110. The suggestions may take into consideration a plurality of factors in determining suggestions, such as, recently submitted query messages, active thread topics, and frequent submissions. For example, the search dialogue system may determine from messages 222A-224E that the user is searching for hotels in Moscow. Therefore, the search dialogue system may suggest reviews for particular hotels, in response to user input "reviews."

The advertisement display location 204 displays advertisements such as advertisements 226, 228, and 230 within the search dialogue user interface. Advertisement may be, for example, provided based on topics of threads that the user is frequently searching within or based on a topic of a thread that the user is currently searching within. For example, since the user is searching for information relating to a "trip to Moscow" within thread 220, advertisements for hotels 226, and 228, and advertisements for travel services 230 may be displayed in the advertisement display location 226.

Figure 3:
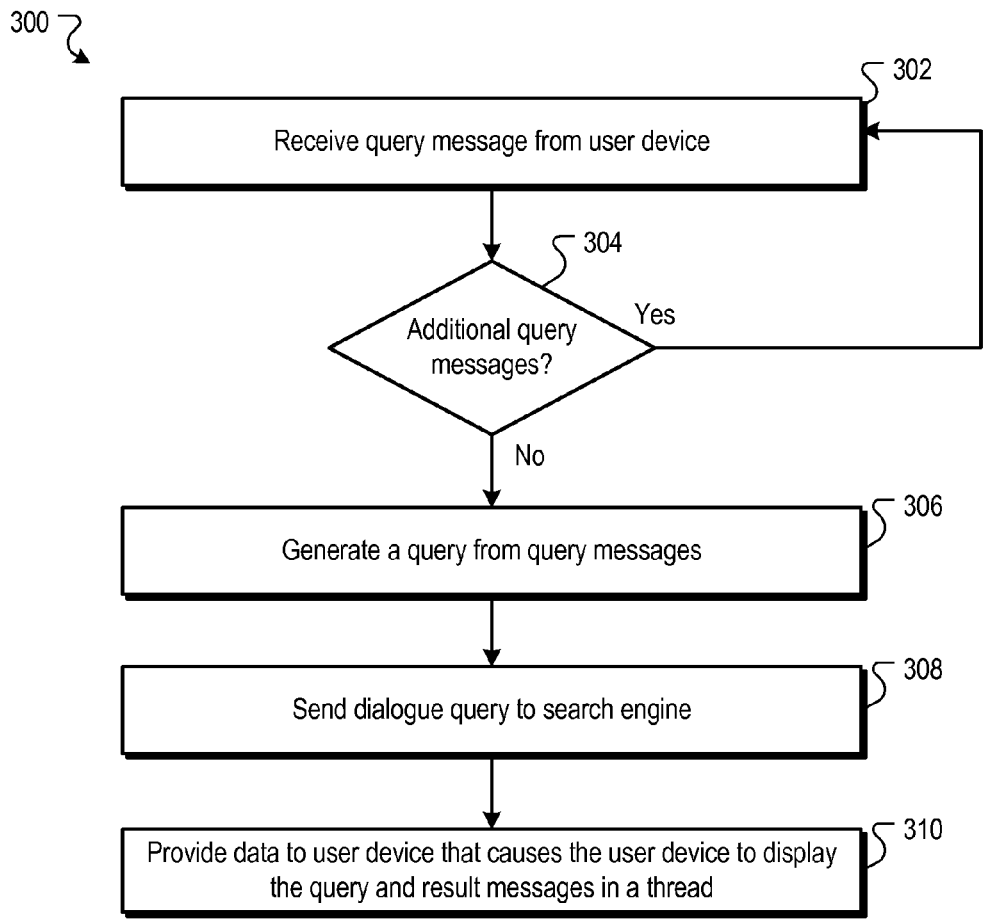
FIG. 3 is a flow diagram of an example process for threading messages in a search dialogue user interface.

FIG. 3 is a flow diagram of an example process for threading messages in a search dialogue user interface. The process 300 can be implemented in a data processing apparatus (e.g., one or more computers and associated storage devices). The process is described in the context of an iterative example to illustrate the processing of query messages and how query messages are threaded.

The process 300 receives a query message form a user device (302) for processing in a thread. For example, the process 300 may receive a query message communicated from user device 114 in which the interface 200 is displayed.

The process 300 begins a process loop for determining if additional query messages are available for processing within the thread (404). For example, in response to a timeout or a command by a user, the process 300 may determine that no additional query messages are available. Conversely, if the user immediately begins typing after hitting the return key, the process 300 may determine that additional query messages are available.

The process 300 generates a query from query messages (306), once no additional query messages are available for processing. The query is generated based on the one or more query messages received. For example, the process 300 may generate a query for "Moscow hotels under 300" in response to a user providing a search query message "Moscow hotels" followed by a search query message "under 300."

The process 300 sends the generated query to a search engine (308). For example, the query "Moscow hotels under 300" may be provided to search engine 110.

The process 300 provides data to a user device that causes the user device to display the query and result messages in a thread (310). The result message is displayed in the same thread in which the one or more query messages were submitted. In some implementations a result message may be a message containing a link that when selected causes corresponding results to be displayed in a display location separate from the thread. This allows the user to effectively track the queries submitted and the results received in response to the query submissions.

Figure 4:
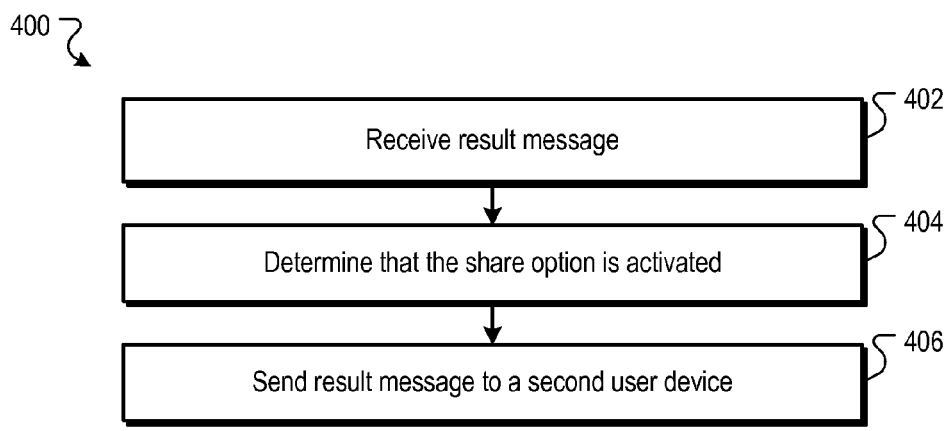
FIG. 4 is a flow diagram of an example process for sharing result messages in a search dialogue user interface.

FIG. 4 is a flow diagram of an example process for sharing result messages in a search dialogue user interface. The operations 402-406 are example operations performed in response to activating the share button 212.

The process 400 begins by receiving a result message 402. For example, the result message may be received in response to one or more query messages submitted by a first user using a first user device.

The process 400 then determines that the share option is activated. The share option may be activated by, for example, a share button 214. Pressing the share button 214 may prompt the user to select one or more user accounts that the user desires to share search results with.

The process 400 sends a result message to a second user device 402 in response to determining that the share option is activated. The second user device is identified based on a user account specified by the first user. The result message may then be displayed on both the first user device and the second device. In some implementations, the process 400 may be used to send the result message to multiple user devices simultaneously.

Figure 5:
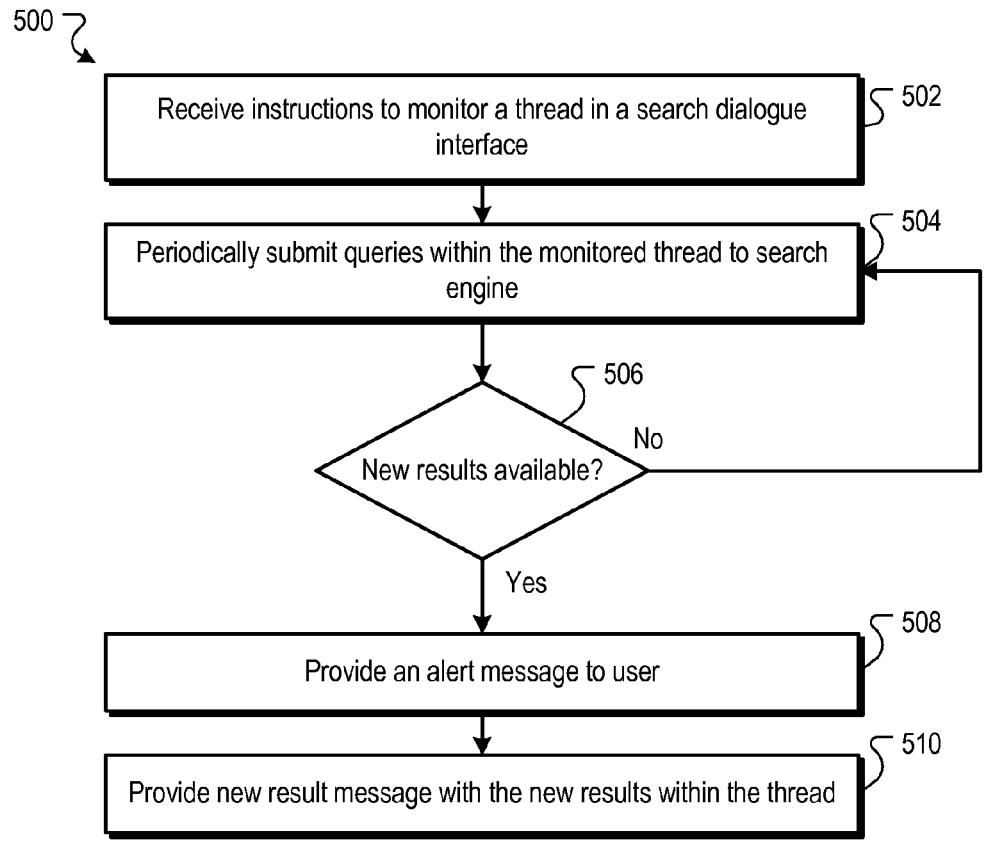
FIG. 5 is a flow diagram of an example process for monitoring threads in a search dialogue user interface.

FIG. 5 is a flow diagram of an example process for monitoring threads in a search dialogue user interface. The process 500 can be implemented in a data processing apparatus (e.g., one or more computers and associated storage devices), and is used to determine whether and when to provide an alert for a monitored thread. As described earlier users may provide different criteria for alerts that can be implemented using the search dialogue user interface. The process 500 monitors a thread for new results and provides an alert accordingly.

The process 500 beings with receiving instructions to monitor a thread in a search dialogue interface 502. Users may select to monitor threads related to certain topics. In some implementations the search dialogue management system may automatically monitor threads that have high priority values or are frequently accessed. For example, the search dialogue management system may automatically monitor the top N ranked threads, N being a threshold value that may be specified by the user or determined by the search dialogue management system. The threshold value N may be, for example, a function of the total number of threads available in a user's search dialogue interface. Alternatively, the threshold value N may be a fixed number for all users.

The process 500 periodically submits queries within the monitored thread to a search engine 504. The process 500 may periodically submit all queries within a monitored thread or only submit selected queries such as the last query derived for a thread. In some implementations, the frequency of query submissions can be specified by each user separately.

The process 500 determines whether new results are returned 506 in response to the periodical submissions. Data specifying the results previously returned may be stored in search dialogue history data store 124 to facilitate the determination. The process 500 begins a process loop that maintains the periodical query submissions until new results are returned.

In response to determining that new results are available, the process 500 provides an alert message to the user 508. The alert message may be displayed within the monitored thread, in addition to a visual indication that is visible when the monitored thread is collapsed.

The process 500 provides a new result message with the new results within the thread 510. The result message may contain links to new resources, or the new resources directly. The process 500 may be applied to monitor multiple threads simultaneously. Accordingly, users may eliminate frequent search submissions to monitor changes in topics of interest.

Figure 6:
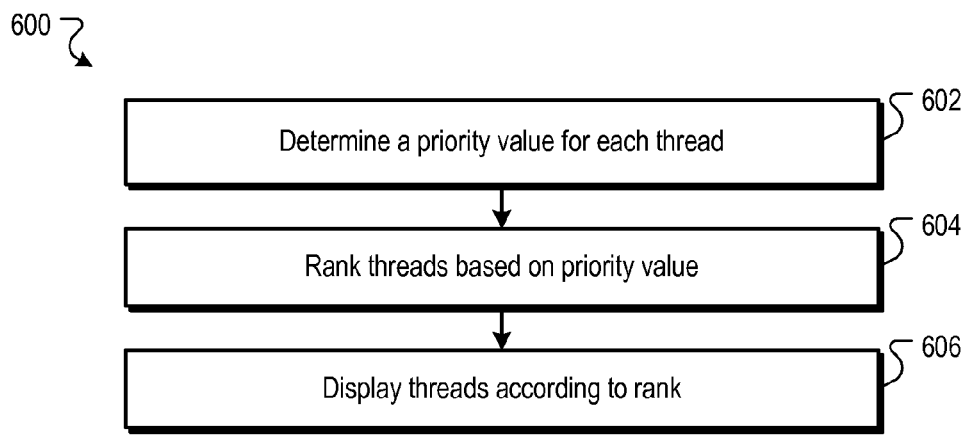
FIG. 6 is a flow diagram of an example process for ranking threads in a search dialogue user interface.

FIG. 6 is a flow diagram of an example process for ranking threads in a search dialogue user interface. The process 600 can be implemented in a data processing apparatus (e.g., one or more computers and associated storage devices), and is used to rank threads based on priority.

The process 600 begins by determining a priority value for each thread 602 within a search dialogue user interface. The priority value may be value determined by the search dialogue management system 112 based on, for example, frequency of access. Priority values associated with threads may change overtime as user interests change. In some implementations, priority values are determined periodically for threads.

Once a priority value is determined for each thread, the process 600 ranks threads based on the priority values 604. For example, frequently accessed threads may be highly ranked relative to threads accessed occasionally.

The process 600 displays threads according to rank 606. For example, highly ranked threads may be displayed at the top of the search dialogue interface. The priority rank may also be utilized to further customize the search dialogue user interface. For example, the highest ranked thread may be used to determine a default query. The default query may be a query automatically submitted to the search dialogue user interface when, for example, a user logs into a search dialogue user interface account.

Figure 7:
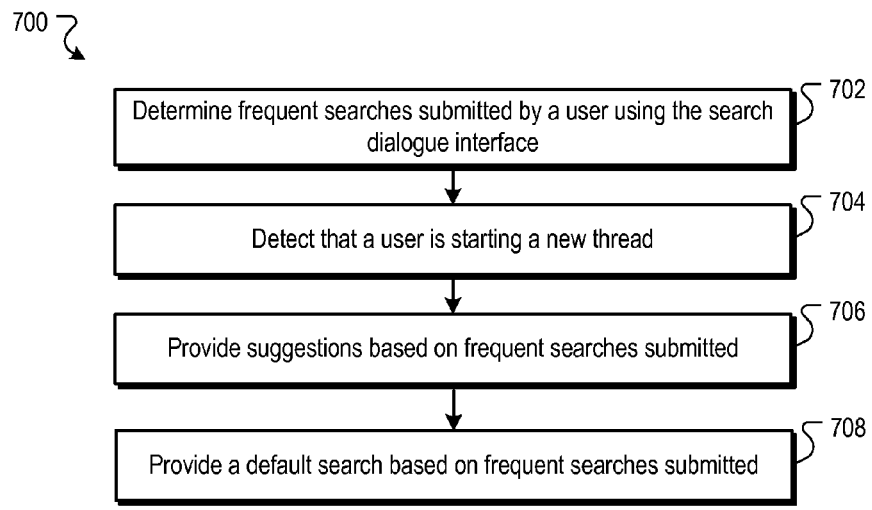
FIG. 7 is a flow diagram of an example process for providing suggestion queries in a search dialogue user interface.

FIG. 7 is a flow diagram of an example process for providing suggestions queries in a search dialogue user interface. The process 700 can be implemented in a data processing apparatus (e.g., one or more computers and associated storage devices), and is used to provide suggestions and a default search based on frequent searches submitted.

The process 700 begins by determining frequent searches submitted by a user using the search dialogue interface 702. The user may be identified, for example, by a user account ID. Search dialogue history data store 124 may be used to determine frequent searches submitted by the user.

The process 700 detects when the user is starting a new thread 704. In response to detecting that the user is starting a new thread, the processes 700 provides suggestions based on the frequent searches submitted by the user 704. In some implementations, suggestions may also be based on topics of highly ranked threads and may incorporate priority values associated with each thread in the suggestions determination.

The process 700 provides a default search based on frequent searches submitted the user 706. In some implementations, the default search may also be based on topics of highly ranked threads and may incorporate priority values associated with each thread in the default search determination. For example, a frequently submitted search query that is within a highly ranked thread may likely be selected as a default search.

Figure 8:
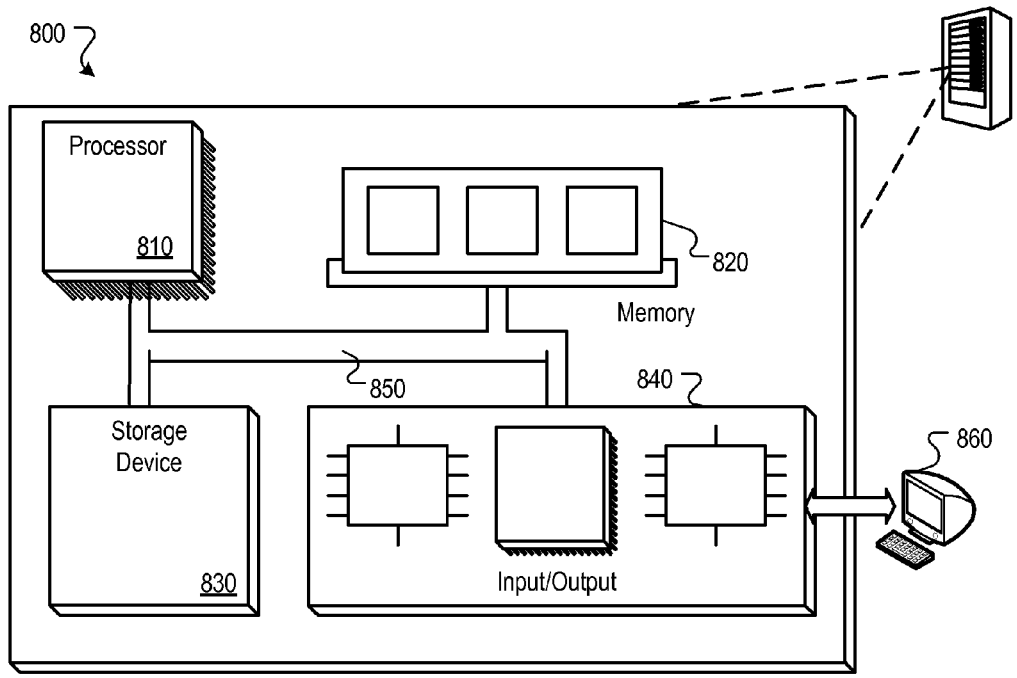
FIG. 8 is a block diagram of a data processing apparatus.

FIG. 8 is block diagram of an example computer system 800 that can be used to customize landing pages. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, or some other large capacity storage device.

The input/output device 840 provides input/output operations for the system 800. In one implementation, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer readable storage medium storing instructions that when executed by a user device cause the user device to perform operations comprising:
    displaying a search user interface within an electronic message processing application associated with an electronic message database, the search user interface comprising:
        (A) an electronic message display area configured to display a plurality of message threads, a respective message thread in the plurality of message threads including a plurality of electronic messages sharing predefined criteria;
        (B) a search dialogue user interface configured to display a plurality of search threads, each search thread comprising a plurality of entries, wherein the entries comprise:
            one or more query messages, each query message being descriptive of one or more search criteria;
            one or more result messages, each result message being a message describing criteria for a corresponding search and that is responsive to one or more preceding query messages within the search thread; and
        wherein a search dialogue user interface is configured to execute user queries against a document database other than the electronic message database by obtaining, from a user, a query message; and executing a user query identified by the query message against the document database other than the electronic message database;
        (C) a search result display location configured to display, to the user, search results corresponding to an active result message.

2. The non-transitory computer readable storage medium of claim 1, wherein each of the one or more result messages is a message describing derived criteria for a corresponding search that is collectively responsive to preceding query messages within the thread.

3. The non-transitory computer readable storage medium of claim 1, wherein the active result message is a last ordered result message within the search thread.

4. The non-transitory computer readable storage medium of claim 1, wherein the active result message is manually activated by a user input specifying a selection of the result message.

5. The non-transitory computer readable storage medium of claim 1, wherein the search thread comprises entries by two or more users, wherein a first of the two or more users provides entries at the user device and a second of the two or more users provides entries from another user device.

6. The non-transitory computer readable storage medium of claim 1, wherein the search dialogue user interface further comprises a share option input, wherein activating the share option input causes one or more result messages to be displayed at a dialogue interface of another user device.

7. The non-transitory computer readable storage medium of claim 1, wherein the search dialogue user interface further comprises a share option, wherein activating the share option causes query messages submitted by first user to be displayed at a dialogue interface of another user device.

8. The non-transitory computer readable storage medium of claim 1, wherein each search thread from the plurality of search threads is associated with a priority value and are ordered in a ranking based on the priority value.

9. The non-transitory computer readable storage medium of claim 8, wherein the priority value is determined based on frequency of interaction with threads.

10. The non-transitory computer readable storage medium of claim 1, wherein a default search query is provided to the search dialogue interface based on frequency of interaction with queries.

11. The non-transitory computer readable storage medium of claim 1, wherein threads are aggregated based on topics and displayed according to the topics.

12. The non-transitory computer readable storage medium of claim 1, wherein threads include sub-threads, each sub-thread being a thread branching from a one of a query message or result message so that a result message in a first sub-thread is responsive to criteria that is different from criteria to which a result message is responsive to in a second sub-thread.

13. The non-transitory computer readable storage medium of claim 1, wherein threads are grouped according to thread labels and displayed according to the thread labels.

14. A method performed by a data processing apparatus, comprising:
    at an electronic device having one or more processors and memory stored instructions for execution by the one or more processors:
    displaying, on the electronic device, a search user interface within an electronic message processing application associated with an electronic message database, the search user interface comprising:
        (A) an electronic message display area configured to display a plurality of message threads, a respective message thread in the plurality of message threads including a plurality of electronic messages sharing predefined criteria;

(B) a search dialogue user interface configured to display a plurality of search threads, each search thread comprising a plurality of entries, wherein the entries comprise:

one or more query messages, each query message being descriptive of one or more search criteria;

one or more result messages, each result message being a message describing criteria for a corresponding search and that is responsive to one or more preceding query messages within the search thread; and wherein a search dialogue user interface is configured to execute user queries against a document database other than the electronic message database by obtaining, from a user, a query message; and executing a user query identified by the query message against the document database other than the electronic message database;

(C) a search result display location configured to display, to the user, search results corresponding to an active result message.

15. The method of claim 14, wherein each of the one or more result messages is a message describing derived criteria for a corresponding search that is collectively responsive to preceding query messages within the thread.

16. The method of claim 14, wherein the active result message is a last ordered result message within the search thread.

17. The method of claim 14, wherein the search thread comprises entries by two or more users, wherein a first of the two or more users provides entries at the user device and a second of the two or more users provides entries from another user device.

18. The method of claim 14, wherein the search dialogue user interface further comprises a share option input, wherein activating the share option input causes one or more result messages to be displayed at a dialogue interface of another user device.

19. The method of claim 14, wherein the search dialogue user interface further comprises a share option, wherein activating the share option causes query messages submitted by first user to be displayed at a dialogue interface of another user device.

20. An electronic device, comprising:

a processor; and a computer storage system storing instructions that when executed by the processor cause the electronic device to perform operations comprising:

displaying a search user interface within an electronic message processing application associated with an electronic message database, the search user interface comprising:

(A) an electronic message display area configured to display a plurality of message threads, a respective message thread in the plurality of message threads including a plurality of electronic messages sharing predefined criteria;

(B) a search dialogue user interface configured to display a plurality of search threads, each search thread comprising a plurality of entries, wherein the entries comprise:

one or more query messages, each query message being descriptive of one or more search criteria;

one or more result messages, each result message being a message describing criteria for a corresponding search and that is responsive to one or more preceding query messages within the search thread; and wherein a search dialogue user interface is configured to execute user queries against a document database other than the electronic message database by obtaining, from a user, a query message; and executing a user query identified by the query message against the document database other than the electronic message database;

(C) a search result display location configured to display, to the user, search results corresponding to an active result message.

\* \* \* \* \*